United States Patent [19]
Murdock

[11] Patent Number: 6,042,172
[45] Date of Patent: Mar. 28, 2000

[54] TORQUE CONTROL MEMBER FOR A VISOR ASSEMBLY

[75] Inventor: Jay A. Murdock, Southgate, Mich.

[73] Assignee: Lear Automotive Dearborn, Inc., Southfield, Mich.

[21] Appl. No.: 09/100,191

[22] Filed: Jun. 18, 1998

[51] Int. Cl.[7] ........................................ B60J 3/02
[52] U.S. Cl. ............................................. 296/97.12
[58] Field of Search ................... 296/97.1, 97.4, 296/97.9, 97.11, 97.12, 97.13; 248/291.1, 224.8

[56] References Cited

U.S. PATENT DOCUMENTS

| | | | |
|---|---|---|---|
| 3,035,864 | 5/1962 | Davidson | 296/97.12 |
| 3,188,685 | 6/1965 | Fletcher | 296/97.9 X |
| 4,390,202 | 6/1983 | Flowerday et al. . | |
| 4,828,313 | 5/1989 | Lanser et al. . | |
| 5,004,289 | 4/1991 | Lanser et al. . | |
| 5,205,635 | 4/1993 | Van Order et al. | 362/83.1 |
| 5,409,285 | 4/1995 | Snyder et al. | 296/97.11 |
| 5,678,879 | 10/1997 | Mailander et al. | 296/97.1 |
| 5,695,237 | 12/1997 | Erickson et al. | 296/97.1 |

*Primary Examiner*—D. Glenn Dayoan
*Assistant Examiner*—Chad D Wells
*Attorney, Agent, or Firm*—MacMillan, Sobanski & Todd, LLC

[57] ABSTRACT

A sun visor assembly is attached to a vehicle headliner near a vehicle windshield and includes a visor substrate body covered by fabric material that is moveable between a raised position and a lowered position. The visor assembly includes a control arm that is mounted to a vehicle support structure, such as a roof, for example. The control arm rotatably supports the visor substrate with respect to the vehicle support structure. In the lowered position the visor substrate is rotated downwardly about the control arm to partially block a top portion of the windshield so that sunlight is prevented from shining directly into an occupant's eyes. In the raised position, the visor is rotated upwardly so that it is near the headliner and does not block the windshield. The visor assembly also includes a control member that connects the control arm to the visor substrate body. The control member selectively positions the visor substrate at various positions between the raised and lowered positions. The control member has a tab that extends in a first direction and a plurality of barbs that extend in a second direction different than the first direction. The tab and barbs retain the control member to the visor substrate.

19 Claims, 3 Drawing Sheets

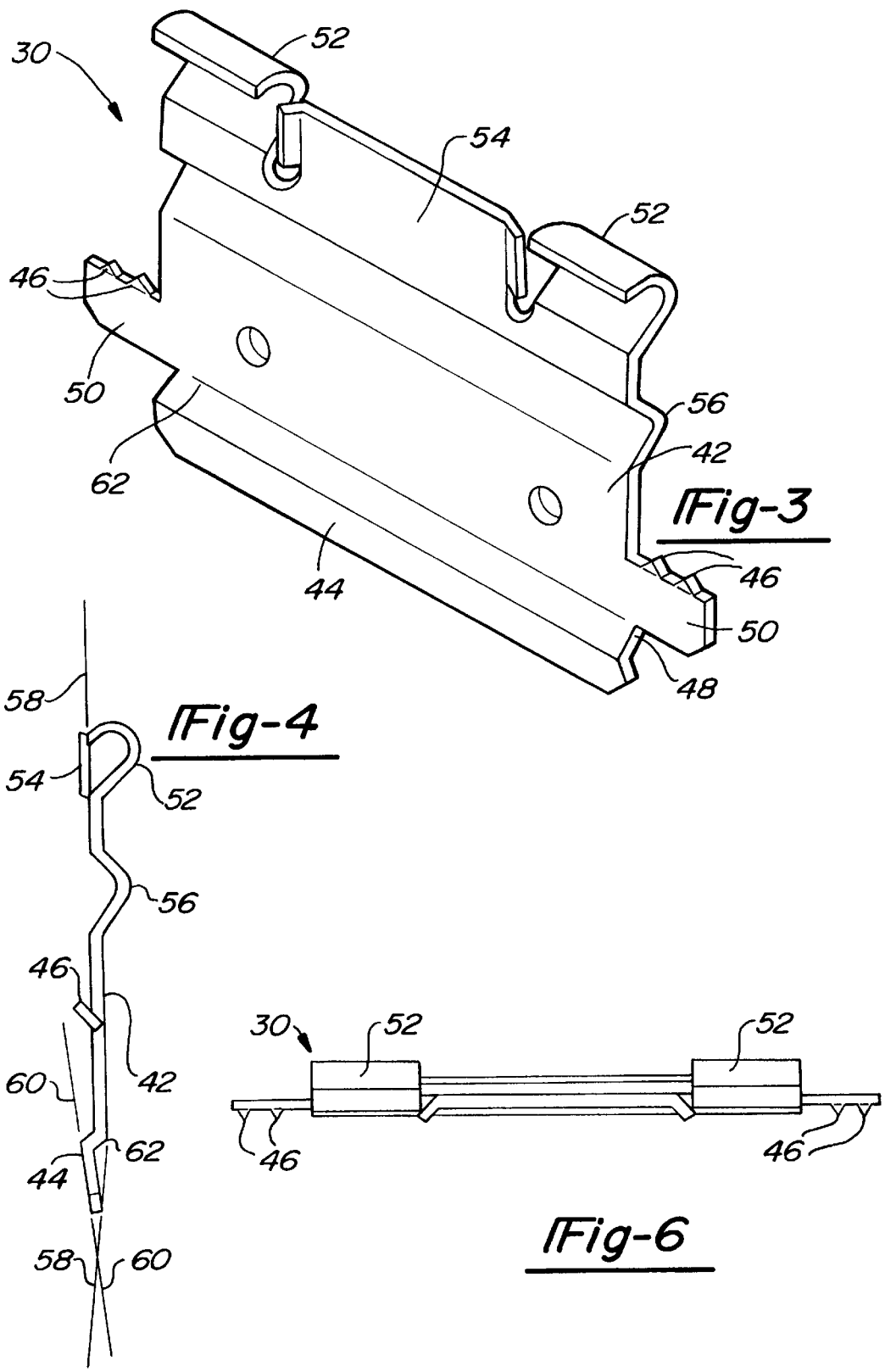

TORQUE CONTROL MEMBER FOR A VISOR ASSEMBLY

BACKGROUND OF THE INVENTION

This application relates generally to a unique control member for a visor assembly and more particularly to a control member using a combination of a tab and a plurality of barbs to retain the control member to a visor body without having to use fasteners.

When driving a vehicle it is desirable to shield an occupant's eyes from glaring sunlight which enters the vehicle interior through the windshield or the side windows. As a result, the interior of vehicles usually includes sun visors.

Visors typically have a visor body and a control arm assembly. The control arm assembly includes a L-shaped rod, which is mounted to the vehicle roof and/or headliner by conventional means. A torque control member rotationally mounts the visor body to the rod, and allows the visor body to be moved between and held at various rotational positions with respect to the rod. This allows the visor body to be moved between a lowered position adjacent the windshield or side window and a raised position adjacent the roof and/or headliner. Also, because the sun may enter the windshield or side window the rod mount should allow the visor to be pivoted between the windshield and the side window in the lowered position.

Torque control members are typically mounted to the visor body with fasteners to prevent movement of the control member with respect to the visor body. When lightweight visor bodies, such as those of air core construction, are used, it is undesirable to use fasteners. Air core constructed visor bodies typically include a first body half that is folded onto a second body half along a seam separating the two halves. The torque control member is installed onto one end of the control arm and the control member is fastened to one or both of the body halves with fasteners. Then the first body half is folded on top of the second body half so that the torque control member and part of the control arm are located between the two body halves. The two halves are then joined together along the edge opposite from the folded edge by conventional means.

One disadvantage with using fasteners to attach the control member to the visor body is that the fabric material, which is used to cover the visor body to give it an aesthetically pleasing appearance, can only be attached to the visor body after the control member has been fastened to the visor body. Thus, it is desirable to have a control member that can be attached to the visor body without fasteners so that the visor body can be covered with fabric material before the control member is attached to the visor body.

Also, some control members have a tendency to move with respect to the visor body, which is undesirable. Thus, it is desirable to have a robust control member that is easily installed onto a visor body without fasteners while providing a firm and stable connection to the visor body such that there is no movement of the control member with respect to the visor body.

SUMMARY OF THE INVENTION

A visor assembly includes a visor substrate body rotatably attached to a control arm. The visor assembly is moveable between a raised position where the visor substrate body is located adjacent to a vehicle roof and lowered position where the visor body is rotated downwardly adjacent to a vehicle windshield or window. The visor assembly includes a control member for connecting the control arm to the visor substrate body. The control member allows a user to selectively position and hold the visor body at any of various positions between the stored and lowered positions.

In a preferred embodiment of this invention, the control member includes a central body portion that defines a first longitudinal plane. At least one tab extends outwardly from an edge of the central body portion and at least one barb extends outwardly from the central body portion such that the barb is transverse to the first longitudinal plane. The tab and barb frictionally retain the control member on the visor body.

The subject invention offers several advantages over prior art systems because it provides a visor control member with improved stability and robustness that is easy to assemble and install on a visor and which does not require any fasteners for attachment to the visor body.

These and other features of the present invention will be best understood from the following specification and drawings, the following of which is a brief description.

BRIEF DESCRIPTION OF THE DRAWINGS

FIG. 3 is an enlarged perspective view of the inventive control member.

FIG. 4 is an end view of the control member shown in FIG. 3.

FIG. 6 is a side view of the control member shown in FIG. 3.

DETAILED DESCRIPTION OF THE PREFERRED EMBODIMENT

Figure 1:
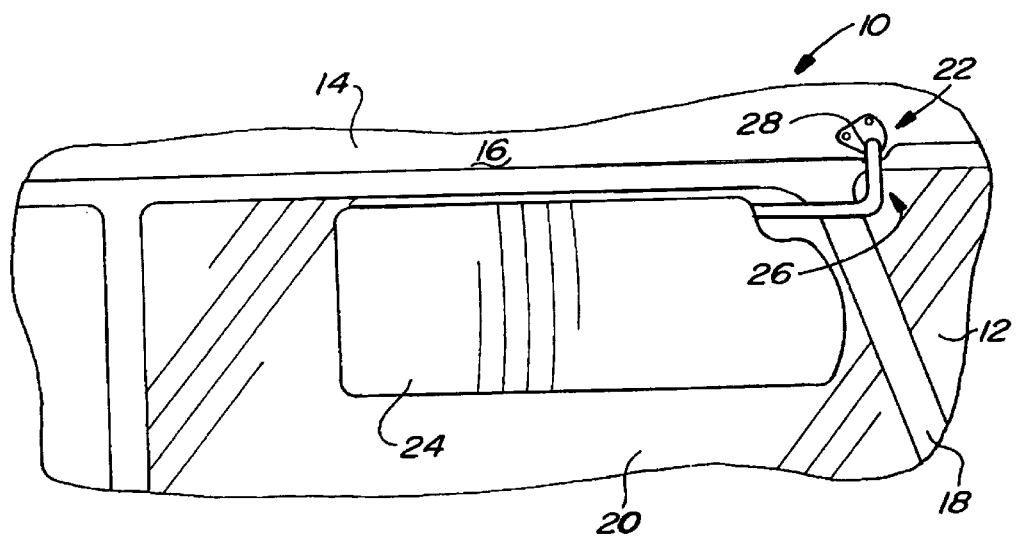
FIG. 1 is a fragmentary perspective view of a sun visor assembly as installed in a vehicle.

Referring to FIG. 1, a vehicle 10 includes a windshield 12 and a roof 14. The roof 14 provides structural support for the vehicle interior, and is usually comprised of a layer of sheet metal covered by a headliner with an upholstered surface 16 to provide a trim appearance to the vehicle.

The vehicle further includes an A-pillar 18 separating the windshield 12 and a side window 20. A sun visor assembly 22 is shown on the driver's side of the vehicle. The visor assembly 22 is attached to the roof 14 near the windshield 12 and is moveable between a stored or raised position and a lowered position. The visor assembly 22 includes a control arm 26 that is mounted to the roof 14 and a visor substrate body 24 covered by fabric material. The control arm 26 is mounted to the roof 14 or other support structure by a mounting bracket 28 and fasteners or other conventional means well known in the art.

The control arm 26 rotatably supports the visor substrate 24 with respect to the roof 14. In the lowered position the visor substrate 24 is rotated downwardly about the control arm 26 to partially block a top portion of the windshield 12 so that sunlight is prevented from shining directly into an occupant's eyes. In the raised position, the visor substrate 24 is rotated upwardly so that it is near the roof 14 and does not block the windshield 12. The visor assembly 22 is also pivotal between the windshield 12 and the side window 20.

This pivotal relationship of the control arm 26 with respect to the roof 14 is accomplished by means well known in the art.

Figure 2:
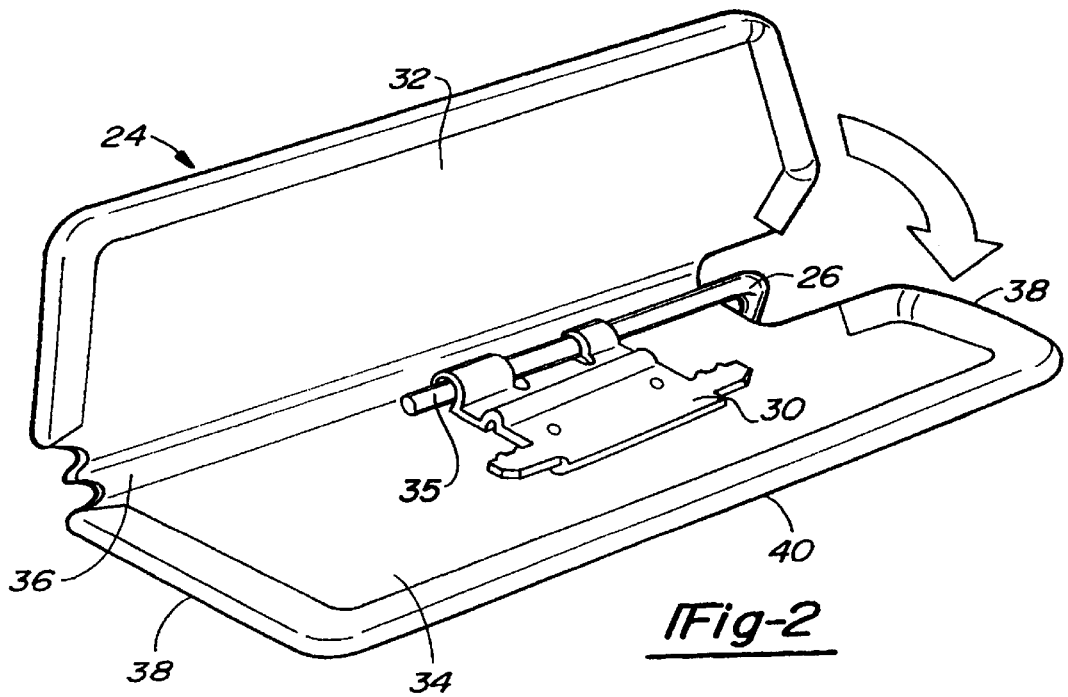
FIG. 2 is a perspective view of a visor assembly having the inventive control member.

The visor assembly 22 also includes a torque control member 30, shown in FIG. 2, that connects the control arm 26 to the visor substrate body 24. The torque control member 30 allows the visor body 24 to rotate about the control arm 26 and selectively positions and holds the visor body 24 at various positions between the raised and lowered positions.

The visor body 24 is preferably of air core construction, also known as coreless construction, or cardboard clamshell construction. Air core constructed visor bodies 24 typically include a first body half 32 that is folded onto a second body half 34 along a folded edge forming a seam 36 separating the two (2) halves 32, 34. The control member 30 is installed onto one end 35 of the control arm 26 and the control member 30 is attached to one of the halves 32 or 34 without fasteners, discussed in more detail below. The first body half 32 is then folded on top of the second body half 34, as indicated by the arrow, so that the control member 30 and part of the control arm 26 are located between the two body halves 32, 34. The halves 32, 34 are then joined together along side edges 38 and the edge 40 opposite from the seam 36 by conventional means.

As shown in more detail in FIG. 3, the control member 30 includes a central body portion 42, at least one tab 44 extending outwardly from an edge 48 of the central body portion 42, and at least one barb 46 extending outwardly from the central body portion 42. Preferably a plurality of barbs 46 are used. The tab 44 and barbs 46 frictionally retain the control member 30 to the visor substrate body 24 without having to utilize fasteners. The connection between the control member 30 and the visor body 24 is firm and stable so that there is no relative movement between the control member 30 and the visor body 24.

The central body portion 42 includes a pair of arms 50 extending outwardly from opposite sides of the central body portion 42. The barbs 46 are positioned on the arms 50 and are preferably integrally formed with the arms 50.

The control member 30 also includes a plurality of resilient retaining members for engaging the control arm 26. The resilient retaining members preferably extend outwardly from the central body portion 42 opposite from the tab 46. The resilient retaining members preferably include a pair of curved arms 52 located on either side of an extension member 54 wherein the visor control arm 26 is positioned between the curved arms 52 and the extension member 54, as shown in FIG. 2. The curved arms 52 and the extension member 54 are deformed from a relaxed position in opposing directions when the control member 30 is installed on the control arm 26. The curved arms 52 and the extension member 54 resiliently retain the control arm 26 to the visor body 24 so that the visor body 24 can rotate about the control arm 26 and thus, move between the raised and lowered positions.

As shown in FIG. 4, the central body portion 42 of control member 30 defines a first longitudinal plane 58. The barbs 46 are positioned so that they are transverse to the first longitudinal plane 58, and are preferably generally perpendicular to the plane 58. The tab 44 defines a second longitudinal plane 60 that is different than the first longitudinal plane 58. The second longitudinal plane 60 is preferably transverse to the first longitudinal plane 58, however, the two planes 58, 60 could be parallel.

The control member 30 preferably has a first ridge 56, shown in FIGS. 3 and 4, adjacent to the curved arms 52. The first ridge 56 maintains the central body portion 42 in the first longitudinal plane when the control member 30 is installed on the control arm 52. In other words, the first ridge 56 acts as a stiffening member for preventing the control member 30 from bending when it is attached to the control arm 26. The control member 30 also preferably includes a second ridge 62 spaced apart from the first ridge and adjacent to the tab 44. The second ridge 62 also serves as a stiffening member for the control member 30 in a similar manner as the first ridge 56.

Figure 5:
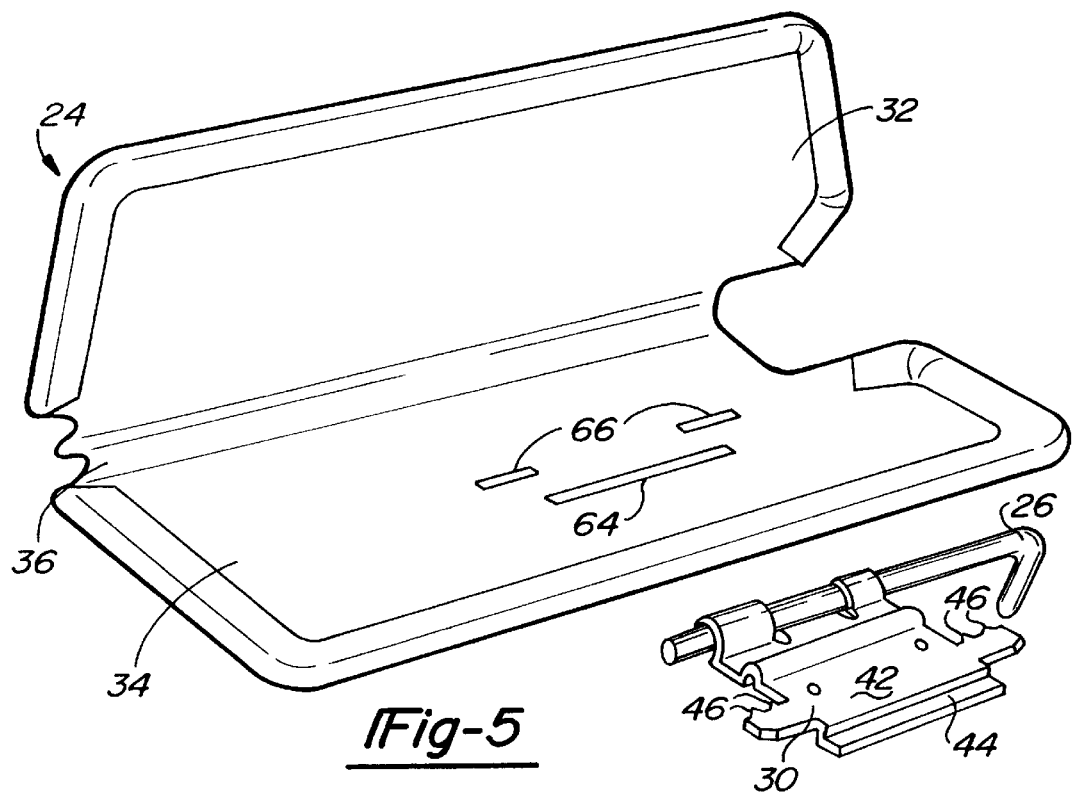
FIG. 5 is a partially exploded, perspective view of the visor assembly shown in FIG. 2.

As shown in FIG. 5, visor substrate body 24 includes a first slot 64 for receiving the tab 44 and at least one second slot 66 for receiving the barbs 46. The first 64 and second 66 slots are preferably spaced apart from each other. More than one second slot 66 can be used to receive the barbs 46. Due to the preferred orientation of the barbs 46 on the arms 50 located on opposite sides of the central body portion 42, the visor body 24 preferably has two smaller second slots 66, spaced apart from each other, for receiving the barbs 46.

When the control member 30 is assembled onto the visor body 24 the tab 44 is slid into the first slot 64 to hold the control member 30 on the visor body 24. The barbs 46 protrude into the second slot(s) 66 to keep the tab 44 from coming out of or rocking within the first slot 64. Preferably, the barbs 46 are pointed, as shown in FIG. 6, so that they grippingly engage the visor body 24.

Figure 7:
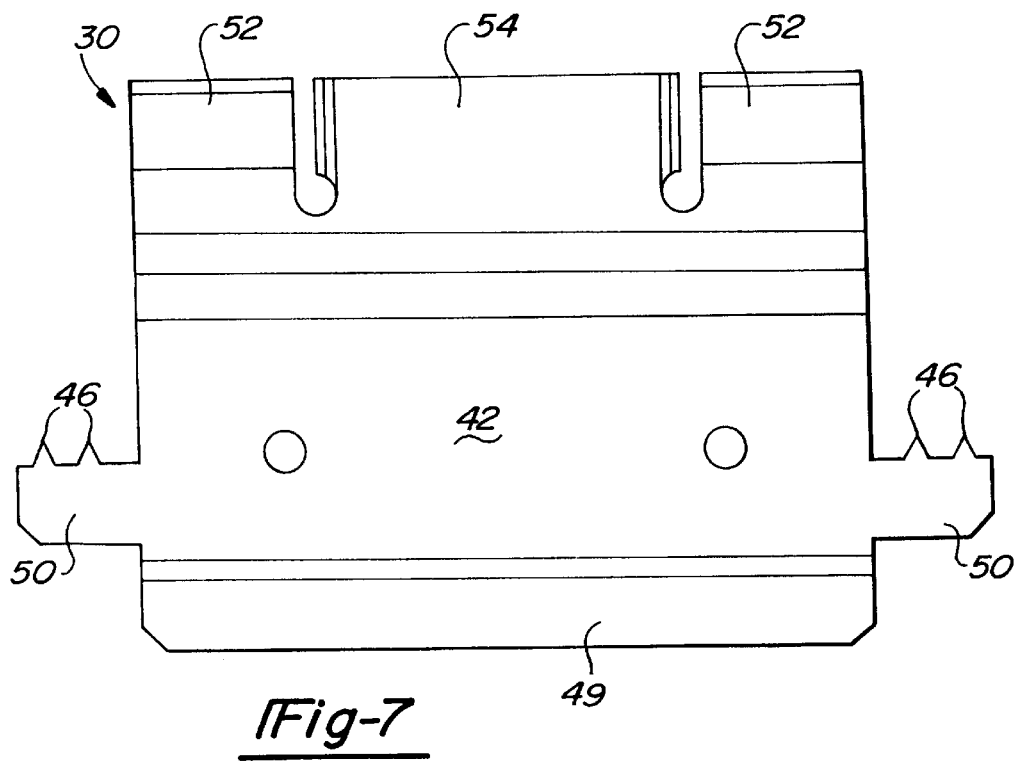
FIG. 7 is a top view of the control member shown in FIG. 3.

The barbs 46 are also preferably located away from the tab 44, as shown in FIG. 7, so that the control member 30 is in a stable orientation when installed onto the visor body 24. The arms 50 with the integral barbs 46 are also preferably located between the curved arms 52 and the tab 44. Spacing the barbs 46 apart from the tab 44 ensures that the control member 30 is firmly held to the visor body 24 and provides a stable mount for the control arm 26.

The principal advantage of the present invention is that the torque control member 30 provides a simple design which is easy to assemble to the control arm 26 and attach to the visor body 24 without fasteners and which provides a firm and stable interface between control member 30 and visor body 24 so that there is no movement between the two.

While a particular invention has been described with reference to the illustrated embodiment, various modifications of the illustrative embodiment will be apparent to persons skilled in the art upon reference to this description without departing from the spirit and scope of the invention. These modifications include, but are not limited to, having a control member 30 with more than one tab 44 or having the tab 44 reorientated with respect to the central body portion 42, having a more than two (2) curved arms 52 and more than one (1) extension member 54, or having a plurality of barbs 46 in various locations on the control member 30. It is therefore contemplated that the appended claims will cover any such modification or embodiments that fall within the true scope of the invention Preferred embodiments of this invention have been disclosed, however, a worker of ordinary skill in the art would recognize that certain modifications would come within the scope of this invention. For that reason, the following claims should be studied to determine the true scope and content of this invention.

I claim:

1. A control member for positionally controlling a visor body comprising:

a central body portion including at least one arm extending outwardly from said central body portion, said central body portion defining a first longitudinal plane;

at least one tab extending outwardly from an edge of said central body portion; and at least one barb being positioned on said at least one arm such that said barb is transverse to said first longitudinal plane, wherein said tab and said barb are capable of frictionally retaining the control member on the visor body.

2. A control member as recited in claim 1 wherein said tab defines a second longitudinal plane that is different than said first longitudinal plane.

3. A control member as recited in claim 2 wherein said second longitudinal plane is transverse to said first longitudinal plane.

4. A control member as recited in claim 1 wherein said barbs are generally perpendicular to said first longitudinal plane.

5. A control member as recited in claim 1 including a plurality of resilient retaining members for engaging a visor control arm.

6. A control member as recited in claim 5 wherein said resilient retaining members extend outwardly from said central body portion opposite from said tab.

7. A control member as recited in claim 5 wherein said plurality of resilient retaining members is a pair of curved arms located on either side of an extension member wherein the visor control arm is positioned between said curved arms and said extension member.

8. A visor assembly for attachment to a roof of a vehicle, the visor assembly comprising:

a visor substrate moveable between a raised position and a lowered position, said visor substrate including a first slot and at least one second slot;

a control arm mounted to a roof of a vehicle, said control arm for rotatably supporting said visor substrate with respect to the roof of the vehicle; and a control member connecting said control arm to said visor substrate, said control member selectively positioning said visor substrate between said raised and said lowered positions, said control member having a tab extending in a first direction and at least one barb extending in a second direction different than said first direction, said tab being received in said first slot and said at least one barb being received in said at least one second slot, wherein said tab and said at least one barb are capable of frictionally retaining said control member to said visor substrate.

9. A visor assembly as recited in claim 8 wherein said visor substrate includes a first portion and a second potion that are joined together such that said first portion rests on said second portion partially enclosing said control arm between the first and second portions.

10. A visor assembly as recited in claim 8 wherein said control member includes a central body portion and a plurality of retaining members, said tab extending outwardly from one edge of said central body portion and said retaining members extending outwardly from an edge opposite from said tab.

11. A visor assembly as recited in claim 10 wherein said central body portion defines a first plane and said tab defines a second plane, said second plane being different than said first plane.

12. A visor assembly as recited in claim 10 wherein said control member includes at least one arm extending outwardly from said central body portion, said at least one barb being positioned on said at least one arm.

13. A visor assembly as recited in claim 12 wherein said at least one barb extends outwardly from said at least one arm and transversely to said first longitudinal plane.

14. A visor assembly as recited in claim 10 wherein said retaining members are comprised of curved arms separated by a generally flat extension member, said control arm being resiliently retained by said control member in said visor substrate between said curved arms and said extension member.

15. A visor assembly as recited in claim 14 wherein said curved arms and said extension member are deformed from a relaxed position in opposing directions when said control member is installed on said control arm.

16. A visor assembly as recited in claim 10 wherein said control member includes a first ridge adjacent to said retaining members, said first ridge for maintaining said central body portion in said first longitudinal plane when said control member is installed on said control arm.

17. A visor assembly as recited in claim 16 wherein said control member includes a second ridge spaced apart from said first ridge and adjacent to said tab, said second ridge for maintaining said central body portion in said first longitudinal plane when said control member is installed on said control arm.

18. A visor assembly for attachment to a roof of a vehicle, the visor assembly comprising:

a visor substrate moveable between a raised position and a lowered position;

a control arm mounted to the roof of the vehicle, said control arm for rotatably supporting said visor substrate with respect to the roof of the vehicle; and a control member connecting said control arm to said visor substrate, said control member selectively positioning said visor substrate between said raised and said lowered positions, said control member including a central body portion, at least one arm extending outwardly from said central body portion, and at least one barb being positioned on said at least one arm, wherein said tab and said at least one barb are capable of frictionally retaining said control member to said visor substrate.

19. A visor assembly according to claim 18 wherein said visor substrate includes a first slot for receiving said tab and at least one second slot for receiving said at least one barb.

* * * * *